US009106938B2

(12) United States Patent
Fontan et al.

(10) Patent No.: US 9,106,938 B2
(45) Date of Patent: Aug. 11, 2015

(54) MONETIZING THIRD-PARTY RECOMMENDED VIDEO CONTENT

(75) Inventors: Antonio Fontan, San Jose, CA (US); Alan Merzon, San Jose, CA (US); Tim Herby, Los Altos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 127 days.

(21) Appl. No.: 13/305,504

(22) Filed: Nov. 28, 2011

(65) Prior Publication Data

US 2013/0139192 A1 May 30, 2013

(51) Int. Cl.
*H04N 7/10* (2006.01)
*H04N 7/025* (2006.01)
*H04N 21/2543* (2011.01)
*H04N 21/442* (2011.01)
*H04N 21/658* (2011.01)
*H04N 21/81* (2011.01)
*G06Q 30/02* (2012.01)

(52) U.S. Cl.
CPC ....... *H04N 21/2543* (2013.01); *G06Q 30/0241* (2013.01); *H04N 21/44222* (2013.01); *H04N 21/6582* (2013.01); *H04N 21/812* (2013.01)

(58) Field of Classification Search
USPC ............. 725/9–22, 31, 39–43, 51, 68, 85, 92, 725/100, 103, 109–110, 114–118, 131, 725/133–134, 139–142, 143–145, 151–153
See application file for complete search history.

(56) References Cited

U.S. PATENT DOCUMENTS

| | | | |
|---|---|---|---|
| 6,177,931 B1 | 1/2001 | Alexander et al. | |
| 7,661,118 B2 | 2/2010 | Matz et al. | |
| 7,703,114 B2 | 4/2010 | Thukral | |
| 7,877,765 B2 | 1/2011 | Bhogal et al. | |
| 2007/0041705 A1 | 2/2007 | Bontempi | |
| 2007/0079353 A1* | 4/2007 | Boortz | 725/135 |
| 2007/0220554 A1* | 9/2007 | Barton et al. | 725/46 |
| 2008/0260352 A1 | 10/2008 | Turner | |
| 2010/0042608 A1* | 2/2010 | Kane, Jr. | 707/5 |
| 2010/0272420 A1 | 10/2010 | Soohoo et al. | |
| 2011/0153418 A1* | 6/2011 | Quine et al. | 705/14.52 |
| 2012/0110615 A1* | 5/2012 | Kilar et al. | 725/32 |
| 2012/0209722 A1* | 8/2012 | Plut | 705/14.67 |

OTHER PUBLICATIONS

Cheng, Jacqui, "Microsoft's DVR patent aims to target ads, increase ad viewership", Retrieved at <<http://arstechnica.com/business/news/2006/12/8398.ars>>, Dec. 2006, p. 1.

* cited by examiner

*Primary Examiner* — Yassin Alata
(74) *Attorney, Agent, or Firm* — Bryan Webster; Kate Drakos; Micky Minhas

(57) ABSTRACT

A method for monetizing third-party recommended content is provided. The method includes receiving a programming feed from a recommender, receiving information regarding one or more items of advertising content from one or more advertising publishers, scheduling recording of video content identified in the programming feed for a user that follows the programming feed, sending the information regarding the one or more items of advertising content to a client device of the user, and receiving information regarding user playback actions that occurred during presentation of the video content identified in the programming feed and the advertising content.

17 Claims, 5 Drawing Sheets

MONETIZING THIRD-PARTY RECOMMENDED VIDEO CONTENT

BACKGROUND

Advertising fees in a broadcast television environment may be based on the ratings of a show with which an advertisement is presented. Such ratings may be determined by tracking viewing habits of a sub-group of users, and basing the ratings on statistically determined viewership of the show. However, with increased usage of digital video recorders, users are increasingly watching video content at time points removed from the original broadcast. Additionally, users are provided with the ability to skip advertisements. This may make tracking advertisement consumption difficult.

In contrast, advertising in computer network environments, such as on web pages, may be based on a number of times a user selects, or "clicks through," and advertisement. Advertising in such an environment is thus based upon actual user interactions with the advertisement. This may allow an advertiser to pay a web page owner only for those instances in which display of the ad generated user activity.

SUMMARY

Embodiments related to the monetization of video content recommended by a third-party recommender other than a content provider and an end user are enclosed. For example, one embodiment provides a method of operating a digital video recorder service, comprising receiving a programming feed from a recommender, receiving information regarding one or more items of advertising content from one or more advertising publishers, and scheduling recording of video content identified in the programming feed for a user that follows the programming feed. The method also includes sending the information regarding the one or more items of advertising content to a client device of the user, and receiving information regarding user playback actions that occurred during presentation of the video content identified in the programming feed and/or one or more items of advertising content. Such information may then be used to arrange payment for the recommender based upon presentation of the advertising content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

When watching stored video content via a digital video recorder (DVR) or other media recorder, users have the option of skipping the advertising content originally broadcast with the video content. This may result in decreased advertising opportunities for advertisers. Further, advertisers, broadcasters, video content producers, etc., may not be able to determine whether users have watched their advertisements or the video content, which may increase the difficulties of setting prices for presenting advertising.

To overcome such difficulties, as described in more detail below, a DVR system may track and store information related to playback actions performed by a user while playing recorded video and advertising content. Such information may then be analyzed by the DVR system, and/or provided to a DVR service for analysis, to determine whether/how often recorded shows and/or advertisements are played.

Such information may be useful not only for helping an advertiser select from among traditional audio/video advertising channels (e.g. broadcast television shows, on-demand show sponsorship) for advertisement delivery, but also may allow the monetization of new channels of content discovery and delivery. For example, in some embodiments, a third-person recommender may earn advertising revenue by originating a recommended programming feed in which recommendations of content items for recording as a DVR series are provided. The recommended content items may include broadcast television items, on-demand content items (including but not limited to network-accessible streaming content items), and any other suitable types of video content items. A DVR configured to follow such programming feeds may receive recording schedules for the programming feeds, and also advertising information (including advertising content and/or pointers to advertising content), from the DVR service. The DVR also may send playback information to the DVR service. The DVR service thus may track the presentation of advertisements, and automatically arrange for payment from the advertising publisher to the recommender. This may allow recommenders to attract advertiser interest and advertising revenue by originating popular feeds.

Figure 1:
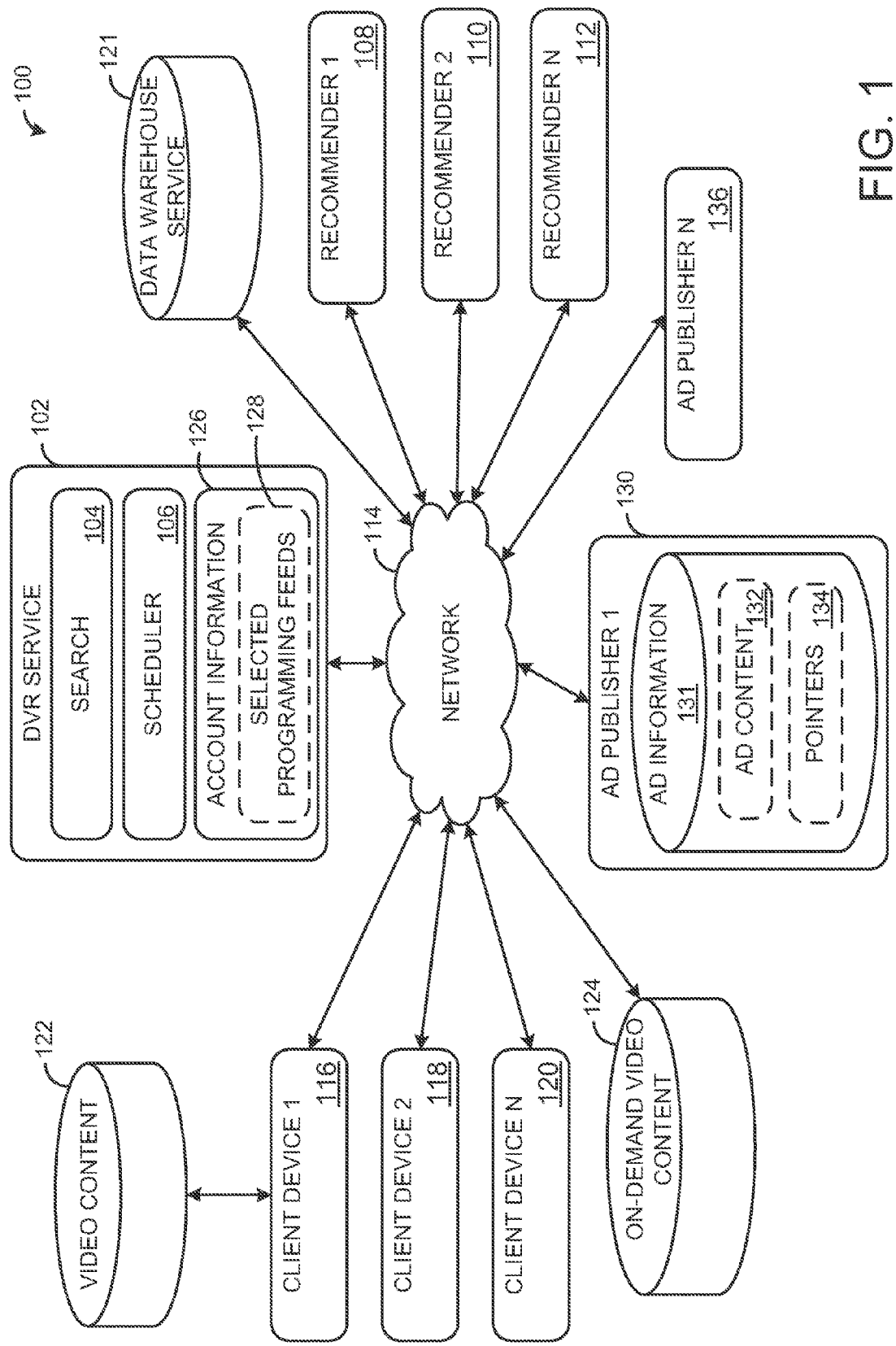
FIG. 1 schematically shows an example system for recording video content according to an embodiment of the present disclosure.

FIG. 1 shows an example embodiment of a system 100 for receiving and/or recording video content. System 100 includes a DVR service 102 accessible over a network by client devices. The depicted DVR service 102 includes a search module 104 and a scheduler 106, but it will be understood that a DVR service may have any suitable architecture.

The search module 104 may be configured to search for content in response to a query for content received from the scheduler 106. For example, where a user of the DVR service requests to follow a programming feed provided by a recommender, the scheduler 106 may trigger the search module 104 to perform searching based upon a definition of the programming feed, and to locate programming information for the feed via the search. The programming information may include such information as locations (broadcast channel/time, on-demand channel/time, network address, etc.) at which video content items recommended by the recommender can be accessed. The programming information from the search module 104 is then returned to the scheduler 106, which may then schedule the recording of the content for the user following the programming feed.

FIG. 1 also illustrates a plurality of recommenders, depicted in FIG. 1 as recommender 1 108, recommender 2 110, and recommender N 112, in communication with the DVR service 102 over a network 114, wherein each recommender provides a recommended programming feed. Likewise, a plurality of client devices, depicted as client device 1 116, client device 2 118, and client device N 120, are also in communication with the DVR service 102 over the network 114.

In the depicted embodiment, DVR service 102 is cooperatively configured to communicate with a plurality of client devices via a network, as shown in FIG. 1. In such embodiments, the DVR service may execute on one or more remotely located computing devices. However, in some embodiments, one or more of the client devices may locally execute a DVR service for that client device. In such embodiments, a data warehouse service 121 may be located on one or more remotely located computing devices cooperatively configured to communicate with the client devices via a network. The data warehouse service 121 may house information such as recording schedules of users, metadata associated with video data that is to be recorded, and/or any other suitable information.

Video content played by the client devices 116, 118, 120 may include previously-recorded and locally stored video content 122, and/or network accessible video content, such as network-accessible on-demand video content 124 and/or recorded video content stored remotely via DVR service 102. Locally stored video content 122 may comprise any suitable video content stored from any suitable source, including but not limited to content such as television shows, movies, etc. recorded from broadcast television channels. Likewise, network accessible on-demand video content 124 may include any suitable content that can be accessed for on-demand playback, such as on-demand content provided by cable and satellite content providers, as well as computer network-accessible streaming media content. It will be understood that on-demand content may be recorded locally 122 or remotely via DVR service 102 in the form of a pointer to a location at which the on-demand content may be accessed, or as a copy of the original content. The term "recorded" and the like as used herein may refer to content recorded in either of these manners.

Users of the client devices 116, 118, 120 may send recording preferences to the DVR service 102, which may be stored as user account information 126. While depicted as being stored locally to the DVR service 102, it will be understood that the user account information also may be stored remotely from the DVR service. As a specific example of user account information, a user that selects to follow particular programming feeds originated by particular recommenders may store the identifications of the feeds, as well as any preferences related to the feed, as selected programming feeds 128. DVR service 102 then may automatically trigger searches related to the selected programming feeds to allow the scheduler 106 to generate recording schedules for recording shows listed in the selected programming feeds.

In addition to programming information, DVR service 102 may be configured to receive advertising information 131 regarding one or more items of advertising content produced by one or more advertising publishers, represented as ad publisher 1 130 and ad publisher n 136. Advertising information 131 may include advertising content items 132, and/or one or more pointers 134 indicating one or more locations at which advertising content is stored. Pointers 134 may be sent to and/or recorded on client devices via DVR service 102. Advertising information 131 also may include metadata related to such advertising content.

In contrast to the traditional use of DVRs to record user-specified television shows and/or series, the scheduling of recordings based upon programming feeds originated by recommenders may provide third-party recommenders with the opportunity to control the video content items that are recorded for users that follow the feeds of those third-party recommenders. This may provide an opportunity for advertising publishers to advertise through such programming feeds, and also to select a programming feed on which to present advertisements based upon ratings (e.g. viewership, positive reviews, etc.) of programming feeds.

Ratings for programming feeds may be based on any suitable factors. For example, in some embodiments, ratings may be based upon a number of users that have selected to follow each feed. Likewise, ratings also may be based upon how many users actually view content recommended within a feed, and/or may be based on how many people actually view advertisements contained within the recommended content.

To track a frequency at which content originated via a feed is viewed, information may be gathered regarding user playback actions that occur during playback of recorded video content. For example, as mentioned above, each client device may track playback actions made by the user while using the client device. Such actions may include selecting a particular recorded item (whether locally stored or available on-demand via a locally stored pointer) for playback, pausing and stopping playback, as well as performing various trick mode commands during playback, such as fast-forward, skip, rewind, and replay commands.

As a more specific example, when a user selects a recording to view, the playback time may be logged. As the user watches the recorded program, commands received from the user may be saved and marked with timestamps of the current play position in the program. Further, after viewing, the user may be prompted to provide input regarding whether he or she "liked" the program, and the user's response is also tracked. Recording deletions also may be tracked. The tracked data may be anonymized and stored remotely in a location accessible by DVR service 102. The tracked data further may be periodically analyzed, and the results of the analysis also may be stored.

Any suitable analyses may be performed on the playback information. For example, in some embodiments, a user's content service provider and/or locale may be used to determine if any known advertisements aired during the recorded program. Then, the timestamps for the trick-mode tracking data may be used to determine which portions of the program were played. Such analysis may be used to determine if any portions of the video content that were watched multiple times or skipped, if any known commercials were watched or skipped, and/or if any commercial breaks were played. Additionally, the user playback information may be used to determine the popularity of programming feeds with users, for example, by detecting user-set priorities of the programming feeds, by determining which recorded video content was watched before being deleted, which content was liked, etc.

The stored analysis results may be used to generate statistical reports to help content creators and advertisers select desired distribution channels. For example, such reports may allow content creators to see that specific programming feeds are more popular, and to seek to have their content to recommend/include in those feeds. Likewise, advertisers may use such popularity data to help identify shows with which to advertise.

In some embodiments, advertisers also may be able to advertise directly via recommended programming feeds. For example, advertisers may be able to sponsor a selected recommended programming feed to have advertisements appear when users following that feed play recorded content items. Examples of such sponsored advertising opportunities may include, but are not limited to, pre-roll advertisements, banner advertisements during the show, and post-roll advertisements. It will be understood that, in various embodiments, a user may or may not be able to skip such ads. Further, advertisements for the sponsor may be displayed on outside sources associated with the recommended programming feed, such as web pages or electronic programming guides, in order to promote peripheral awareness.

Figure 2:
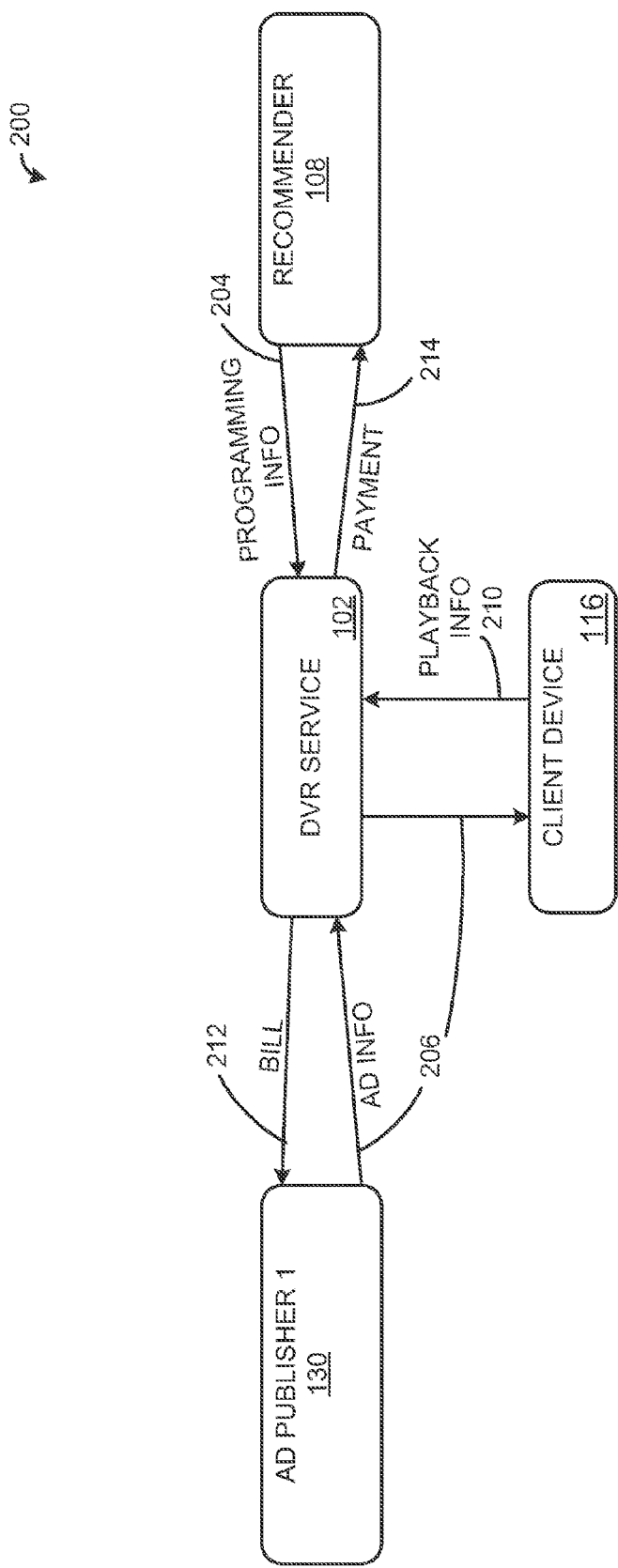
FIG. 2 schematically shows an example system for monetizing third-party recommended video content according to an embodiment of the present disclosure.

FIG. 2 schematically illustrates a system 200 for monetizing third-party recommended content in the use environment of FIG. 1. As described above, the DVR service 102 is configured to receive programming information 204 from a recommender 108, and to schedule the recording of video content for users following that recommender. The viewer may then play the video content via a client device, illustrated in FIG. 2 as client device 116. The depicted DVR service 102 is also configured to receive advertising information 206 from ad publisher 130, and to provide the advertising information for viewing by the user of the client device 116 along with the video content. Non-limiting examples regarding how ad content may be delivered, stored, and viewed will be described below with respect to the embodiments of FIGS. 3 and 4.

The DVR service 102 also may be configured to automatically arrange payment from the ad publisher 130 to the recommender 108 for providing advertising. In some embodiments, the recommender 108 may be paid by the ad publisher whenever an ad is included with content recorded due to the recommender's recommendation. In other embodiments, payment may be triggered by viewing of an advertisement. In yet other embodiments, different levels of payment may be received for delivering ads that are viewed compared to delivered ads that are not viewed.

To arrange payment, the DVR service 102 may be configured to bill 212 the ad publisher 130 upon the occurrence of an event that triggers ad payment (e.g. ad delivery, ad consumption). Upon receipt of payment from the ad publisher 130, the DVR service 102 may be configured to automatically send a payment 214 to the recommender 108 of the programming feed in which the advertising content was presented. In some embodiments, the DVR service 102 may be configured to automatically retain a portion of the payment received from the one or more advertising publishers as a fee for providing the advertising to a user that views the advertisement.

As mentioned above, during video content consumption, user playback information 210 may be gathered from the client device 116 and sent to the DVR service 102. The playback information 210 may include raw playback data for analysis by the DVR service 102, and/or may include statistics from analysis of raw playback data. Examples of statistics that may be tracked from analyzing the raw playback information include, but are not limited to, information regarding one or more of whether the video content was played, whether the advertising content was played, how much of the video content was played, how long of a time lapse between when the video content was stored and played, and how many times the video content was played. In some embodiments, playback information 210 may be gathered for each individual client device, while in other embodiments, playback information 210 may be gathered from a sampling of client devices.

Thus, system 200 may provide advertising channels other than those available with traditional broadcast and on-demand content. Further, system 200 also may allow recommenders of video content to generate revenue by providing popular recommendations. This may provide an incentive for recommenders to generate high numbers of views for recommended video content, as increased viewership of the recommended content may lead to increased viewership of the advertising content presented with the recommended video content, and thus increased advertising revenue.

Figure 3:
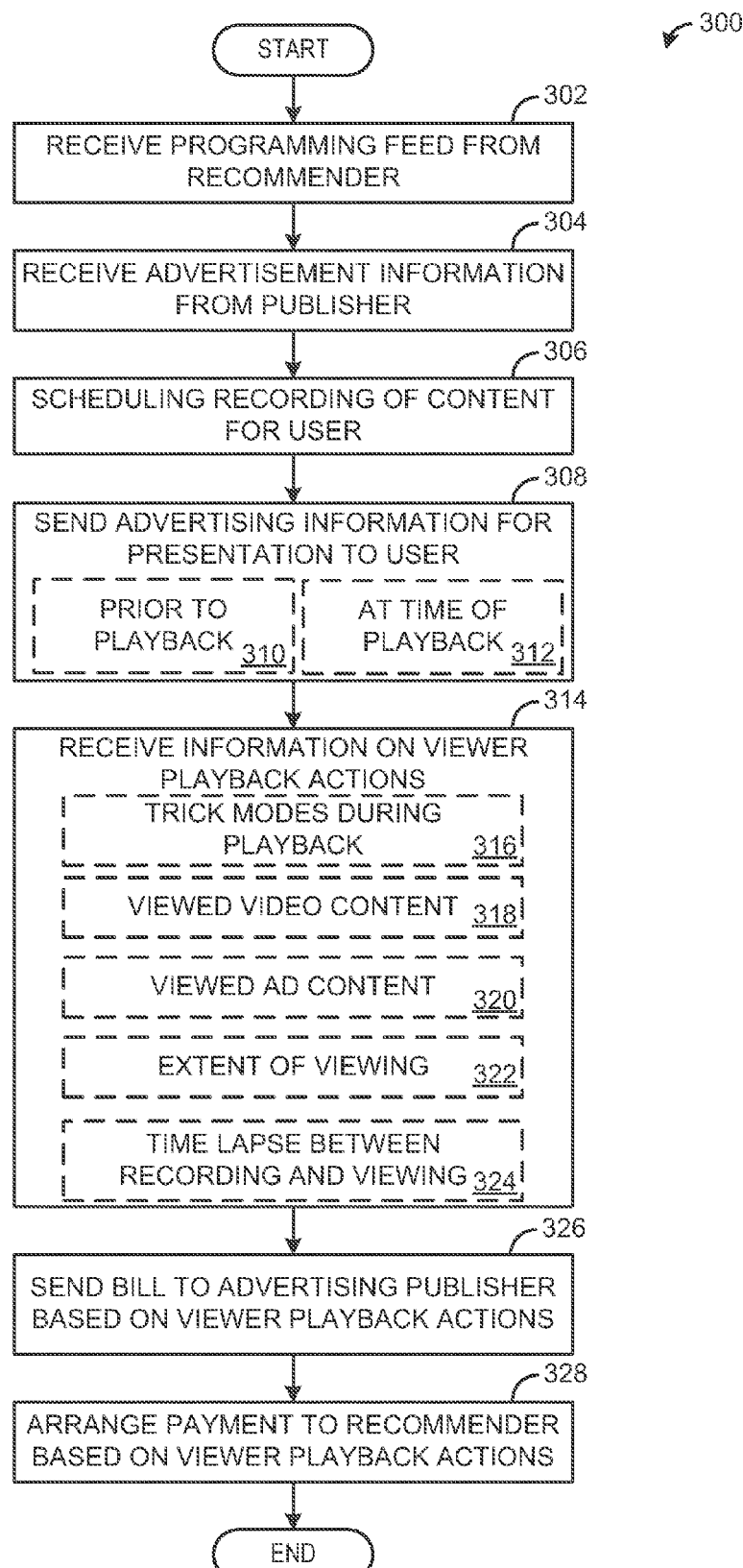
FIG. 3 shows a flow diagram depicting an example method for monetizing third-party recommended content according to an embodiment of the present disclosure.

FIG. 3 shows an embodiment of a method 300 for monetizing recorded video content recommended by a third-party recommender. Method 300 is presented from the perspective of a DVR service, such as DVR service 102, but it will be understood that the method may be performed by any other suitable device in any suitable video content and advertising delivery environment. Method 300 comprises, at 302, receiving a programming feed from a recommender. The programming feed may comprise recommendations of broadcast content and/or on-demand video content for recording. It will be understood that the programming feed may be received in the form of periodic updates performed based upon queries triggered by a DVR service scheduler, or in any other suitable manner.

At 304, method 300 comprises receiving information regarding one or more items of advertising content from one or more advertising publishers. The advertising information may include advertising content, and/or may include pointers indicating a location from which advertising content may be retrieved at a later time, such as at playback time. Next, method 300 comprises, at 306 scheduling recording of video content identified in the programming feed for a user that follows the programming feed. It will be understood that the scheduled recordings may be recorded by any suitable recording device located either locally or remotely to the user's client device.

At 308, method 300 comprises sending the information regarding the one or more items of advertising content to a client device of the user for presentation to the user of the client device. This may include sending the advertising content items to be presented, and/or may include pointers that indicate a location from which advertising content may be retrieved, as described above. The advertising information may be recorded prior to presentation by the client device, as illustrated at 310, or may be sent upon playback of the recorded video content item, as indicated at 312.

After the video content and advertising information have been sent to the client device, information regarding user playback actions may be received at 314. As described above, such information may include raw data and/or analyzed data for analysis. Examples of raw data may include information regarding trick mode playback during content and/or advertisement presentation, as shown at 316. Examples of analyzed information includes, but are not limited to, information regarding whether the video content was played, as indicated at 318, whether the advertising content was played, as indicated at 320, and the extent to which the video and advertising content were played, as indicated at 322. The extent to which the content was viewed may include how many times the content was played, the duration of the viewing of the video content, etc. The data also may include a time lapse between when an item of video content was recorded and played, as indicated at 324. It will be understood that these examples are illustrative, and not intended to be limiting in any manner.

At 326, method 300 comprises automatically billing the one or more advertising publishers for presentation of the advertising content. As mentioned above, in some embodiments, the billed amount may be determined based on the information regarding user playback actions, including but not limited to how many times users played an advertising content item provided by the advertising publisher. Next, at 328, method 300 comprises automatically arranging payment to the recommender based upon the billed amount.

Figure 4:
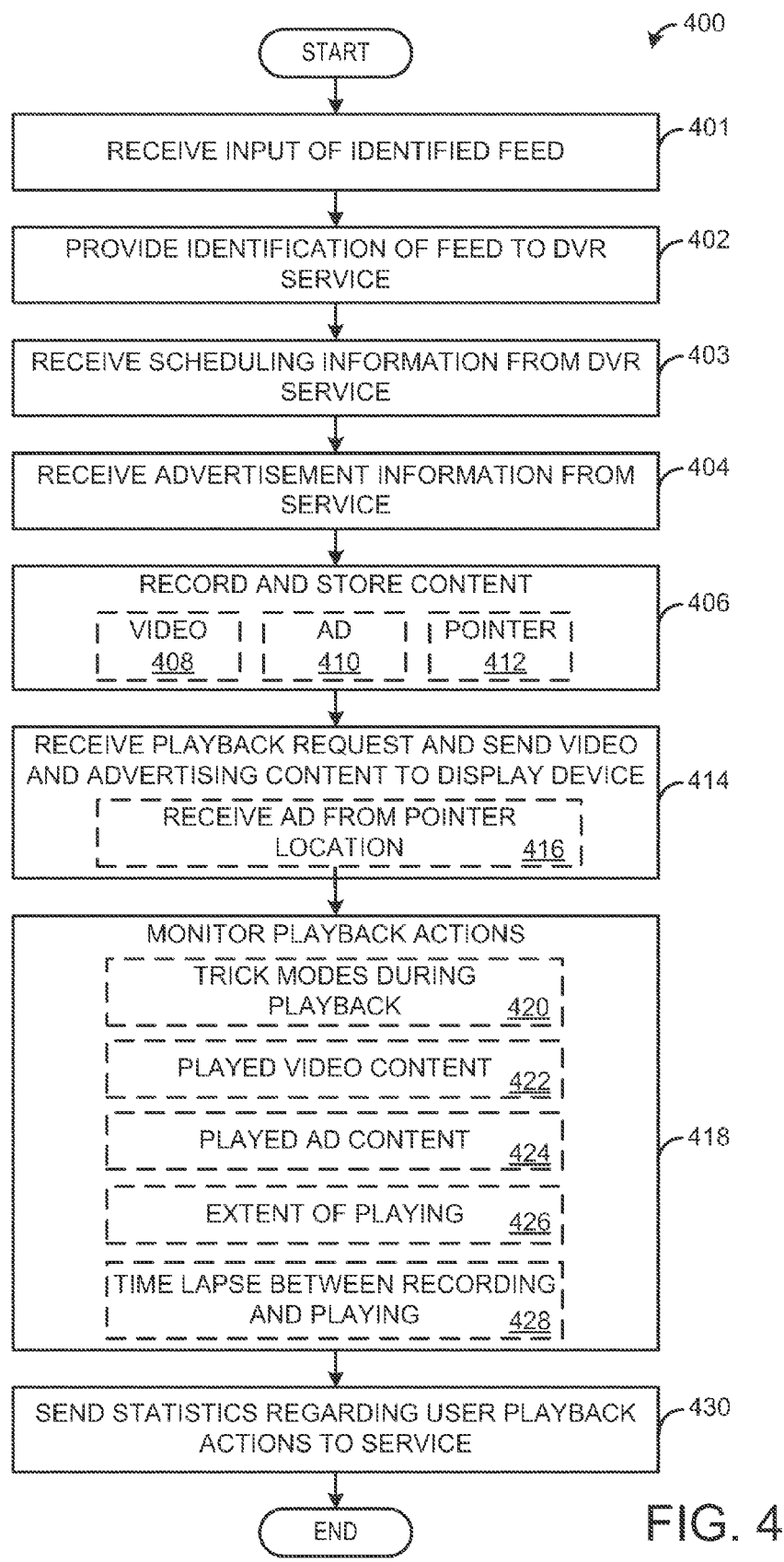
FIG. 4 shows a flow diagram depicting an example method for operating a digital video recorder according to an embodiment of the present disclosure.

FIG. 4 illustrates an embodiment of a method 400 of operating an end user client device for recording content and presenting recorded content. While presented in the specific context of recording content locally, it will be understood that the method also may be applied to environments in which content is stored remotely from a user's media consumption environment. Method 400 comprises, at 401, receiving a user input identifying a recommended programming feed to follow, and at 402, providing the identified recommended programming feed identification to a DVR service. Next, method 400 comprises, at 403, receiving from the DVR service scheduling information that specifies one or more video content items on the DVR or client device to be recorded, wherein the content is scheduled based upon its inclusion in the identified recommended programming feed. The video content items may include broadcast video content broadcast and/or pointers to on-demand video content, which may include network-accessible streaming content. It will be understood that, in instances where recorded content is stored remotely, process 403 may be omitted.

Next, at 404, method 400 comprises receiving information regarding one or more items of advertising content. As explained above with respect to FIGS. 1-3, the advertising content may include advertising content items and/or pointers each indicating a location from which advertising content items may be retrieved at playback time. The information may be received from the DVR service, or any other suitable source.

At 406, method 400 comprises recording the received content in local storage. The content may include video content 408, advertising content 410, and/or pointers 412 to advertising content and/or on-demand video content. At 414, method 400 includes receiving a playback request, and in response, sending one or more items of stored video content and one or more items of advertising content to a display device. This may include, for example, receiving the advertising content from a location specified by a selected pointer at 416, and/or may include retrieving one or more video content items stored remotely from the client device and sending them to the display device.

Method 400 further comprises, at 418, monitoring user playback actions taken while presenting the video and/or advertising content. As described above, the user playback actions monitored at 418 may include play and stop commands, as well as trick mode actions 420 such a rewind, fast-forward, skip, pause, etc. These actions may represent various items of information useful for the presentation of advertisements, such as whether the video content was played, as indicated at 422, whether the advertising content was played, as indicated at 424, an extent to which the video and advertising content were viewed, as indicated at 426, and/or a time lapse between when an item of video content was recorded and when it was viewed, as indicated at 428. It will be understood that these examples are presented for the purpose of illustration, and are not intended be limiting in any manner.

At 430, method 400 comprises sending information regarding the user playback actions to a remote service. The information may be sent in raw or analyzed form to the remote service, and may include the information described above at 420-428. The information may be usable by the service to facilitate payment to the recommender from money received via billing of the advertising publisher. In some embodiments, the remote service may include the DVR service, while in other embodiments, the remote service may include a service separate from the DVR service.

In some embodiments, the above described methods and processes may be tied to a computing system including one or more computers. In particular, the methods and processes described herein may be implemented as a computer application, computer service, computer API, computer library, and/or other computer program product.

Figure 5:
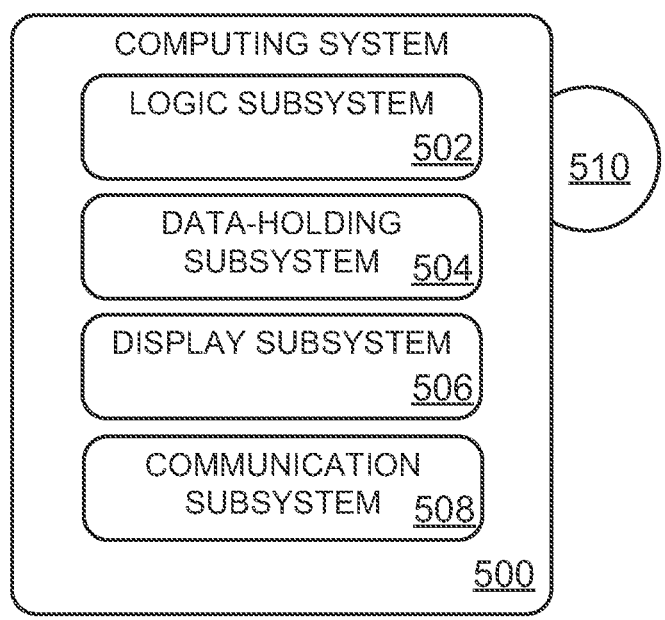
FIG. 5 schematically shows a non-limiting example of a computing system according to an embodiment of the present disclosure.

FIG. 5 schematically shows a nonlimiting computing system 500 that may perform one or more of the above described methods and processes. Computing system 500 is shown in simplified form. It is to be understood that virtually any computer architecture may be used without departing from the scope of this disclosure. In different embodiments, computing system 500 may represent a client device or a server system on which a DVR service is implemented, and may take the form of a mainframe computer, server computer, desktop computer, laptop computer, tablet computer, home entertainment computer, network computing device, mobile computing device, mobile communication device, gaming device, remote control device, etc.

Computing system 500 includes a logic subsystem 502 and a data-holding subsystem 504. Computing system 500 may optionally include a display subsystem 506, communication subsystem 508, and/or other components not shown in FIG. 5. Computing system 500 may also optionally include user input devices such as remote controls, keyboards, mice, game controllers, cameras, microphones, and/or touch screens, for example.

Logic subsystem 502 may include one or more physical devices configured to execute one or more instructions. For example, the logic subsystem 502 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 502 may include one or more processors that are configured to execute software instructions. Additionally or alternatively, the logic subsystem 502 may include one or more hardware or firmware logic machines configured to execute hardware or firmware instructions. Processors of the logic subsystem 502 may be single core or multicore, and the programs executed thereon may be configured for parallel or distributed processing. The logic subsystem 502 may optionally include individual components that are distributed throughout two or more devices, which may be remotely located and/or configured for coordinated processing. One or more aspects of the logic subsystem 502 may be virtualized and executed by remotely accessible networked computing devices configured in a cloud computing configuration.

The data-holding subsystem 504 may include one or more physical, non-transitory, devices configured to hold data and/or instructions executable by the logic subsystem 502 to implement the herein described methods and processes. When such methods and processes are implemented, the state of the data-holding subsystem 504 may be transformed (e.g., to hold different data).

The data-holding subsystem 504 may include removable media and/or built-in devices. The data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and the data-holding subsystem 504 may be integrated into one or more common devices, such as an application specific integrated circuit or a system on a chip.

FIG. 5 also shows an aspect of the data-holding subsystem 504 in the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

It is to be appreciated that the data-holding subsystem 504 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 500 that is implemented to perform one or more particular functions. In some cases, such a module, program, or engine may be instantiated via logic subsystem 502 executing instructions held by the data-holding subsystem 504. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 506 may be used to present a visual representation of data held by the data-holding subsystem 504. As the herein described methods and processes change the data held by the data-holding subsystem 504, and thus transform the state of the data-holding subsystem 504, the state of display subsystem 506 may likewise be transformed to visually represent changes in the underlying data. Display subsystem 506 may include one or more display devices utilizing virtually any type of technology. Such display devices may be combined with logic subsystem 502 and/or the data-holding subsystem 504 in a shared enclosure, or such display devices may be peripheral display devices.

When included, communication subsystem 508 may be configured to communicatively couple computing system 500 with one or more other computing devices. Communication subsystem 508 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a digital video recorder service, the method comprising:
   receiving a programming feed from a recommender, the recommender being a user of the digital video recorder service;
   receiving information regarding one or more items of advertising content from one or more advertising publishers;
   scheduling recording of video content identified in the programming feed for a user that follows the programming feed;
   sending the information regarding the one or more items of advertising content to a client device of the user that follows the programming feed;
   receiving information regarding user playback actions that occurred during presentation of the video content identified in the programming feed and the one or more items of advertising content;
   billing the one or more advertising publishers for presentation of the advertising content based on the user playback actions regarding the one or more items of advertising content; and
   arranging payment from the one or more advertising publishers to the recommender of the programming feed based on the user playback actions regarding the one or more items of advertising content.

2. The method of claim 1, wherein billing the one or more advertising publishers for presentation of the advertising content further comprises billing the one or more advertising publishers based on how many times the one or more items of advertising content were played.

3. The method of claim 1, wherein sending the information regarding the one or more items of advertising content further comprises sending the one or more items of advertising content.

4. The method of claim 3, further comprising sending scheduling information to the client device, and sending the advertising content to the client device concurrently with the scheduling information.

5. The method of claim 3, further comprising sending scheduling information to the client device, and sending the advertising content to the client device separately from the scheduling information.

6. The method of claim 1, wherein sending the information regarding the one or more items of advertising content further comprises sending a pointer identifying a location from which advertising content may be obtained.

7. The method of claim 1, wherein receiving information regarding user playback actions further comprises receiving information regarding one or more of whether the video content was played, whether the advertising content was played, how much of the video content was played, how long of a time lapse between when the video content was stored and played, and how many times the video content was played.

8. The method of claim 1, wherein receiving the information regarding user playback actions comprises receiving raw playback data, and further comprising analyzing the raw playback data to determine one or more of whether the video content was played, whether the advertising content was played, how much of the video content was played, how long of a time lapse between when the video content was stored and played, and how many times the video content was played.

9. A computing device, comprising:
   a processor; and
   a data-holding subsystem holding instructions executable by the processor to:
      receive a programming feed from a recommender;
      receive information regarding one or more items of advertising content from one or more advertising publishers;
      send scheduling information to a client device to facilitate video content recording by the client device, the scheduling information being based on the programming feed;
      send the information regarding the one or more items of advertising content to the client device;
      receive information regarding user playback actions made during playback of the recorded video content and the one or more items of advertising content;
      rate the programming feed based on one or more of the user playback actions, a receipt of a user input regarding whether a user liked the programming feed, and a number of users that have selected to follow the programming feed;
      bill the one or more advertising publishers for presentation of the advertising content based on the user playback actions regarding the one or more items of advertising content; and
      arrange payment from the one or more advertising publishers to the recommender of the programming feed based on the user playback actions regarding the one or more items of advertising content.

10. The computing device of claim 9, wherein the programming feed further comprises information regarding a location at which video content stored remotely from the client device may be retrieved for playback.

11. The computing device of claim 10, wherein the instructions are further executable to analyze the information regarding user playback actions to determine one or more of whether the video content was played, whether the one or more items of advertising content were played, how much of the video content was played, how long after the video content was stored was the video content played, and how many times the video content was played.

12. A method of operating a digital video recorder (DVR), the method comprising:
   receiving a user input identifying a programming feed from which to receive recommendations, the programming feed comprising programming recommended by a recommender user;
   sending an identification of the programming feed to a remote service;
   receiving from the remote service scheduling information identifying one or more video content items for recording on the DVR, the video content being identified in the programming feed;
   receiving from the remote service information regarding one or more items of advertising content from an advertising publisher;
   recording the one or more video content items on the DVR;
   in response to a playback request from a user, sending one or more items of stored video content and one or more items of advertising content to a display device;
   monitoring user playback actions while sending the one or more items of stored video content and the one or more items of advertising content to the display device;
   sending information regarding the user playback actions to the remote service;
   billing the advertising publisher for presentation of the advertising content based on the user playback actions regarding the one or more items of advertising content; and
   arranging payment from the advertising publisher to the recommender user of the programming feed based on the user playback actions regarding the one or more items of advertising content.

13. The method of claim 12, wherein the information regarding user playback actions comprises information regarding trick mode commands received while sending the one or more items of stored video content and the one or more items of advertising content to the display device.

14. The method of claim 12, wherein the information regarding the one or items of advertising content comprises a pointer indicating a location where an advertising content item is stored, and wherein sending the one or more items of advertising content to the display device further comprises receiving the advertising content from the location indicated by the pointer and sending the advertising content to the display device.

15. The method of claim 12, wherein sending the information regarding user playback actions to the remote service further comprises analyzing playback commands received, and then sending information regarding one or more of whether the video content was played, whether the advertising content was played, how much of the video content was played, how long of a time lapse between when the video content was stored and played, and how many times the video content was played.

16. The method of claim 12, wherein sending the information regarding user playback actions to the remote service further comprises sending raw playback information to the remote service.

17. The method of claim 12, further comprising receiving from the remote service information regarding a location of one or more video content items stored remotely from the DVR, and in response to the playback request from the user, retrieving the one or more video content items stored remotely from the DVR and sending them to the display device.

* * * * *